US009685681B2

(12) United States Patent
Baek et al.

(10) Patent No.: US 9,685,681 B2
(45) Date of Patent: Jun. 20, 2017

(54) BATTERY PACK

(75) Inventors: Woon-Seong Baek, Yongin-si (KR);
Jong-pil Kim, Yongin-si (KR);
Sang-jin Park, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1388 days.

(21) Appl. No.: 13/044,778

(22) Filed: Mar. 10, 2011

(65) Prior Publication Data

US 2012/0121936 A1 May 17, 2012

Related U.S. Application Data

(60) Provisional application No. 61/414,079, filed on Nov. 16, 2010.

(51) Int. Cl.
*H01M 10/42* (2006.01)
*H01M 2/34* (2006.01)

(52) U.S. Cl.
CPC ............. *H01M 10/42* (2013.01); *H01M 2/34* (2013.01)

(58) Field of Classification Search
None
See application file for complete search history.

(56) References Cited

U.S. PATENT DOCUMENTS

2005/0153195 A1 7/2005 Han
2005/0208346 A1* 9/2005 Moon .................. H01M 2/30
429/7
2007/0152631 A1* 7/2007 Seo ............................ 320/112

(Continued)

FOREIGN PATENT DOCUMENTS

KR 10-2005-0121116 A 12/2005
KR 1020060088230 A 8/2006

(Continued)

OTHER PUBLICATIONS

Korean Registration Determination Certificate dated Mar. 11, 2013 issued by KIPO in connection with Korean Patent Application No. 10-2011-0043069 which claims priority from the present Application. Request for Entry of the for Accompanying Office Action attached herewith.

(Continued)

*Primary Examiner* — Barbara Gilliam
*Assistant Examiner* — Adam A Arciero
(74) *Attorney, Agent, or Firm* — Robert E. Bushnell, Esq.

(57) ABSTRACT

A battery pack including a battery cell including an electrode assembly arranged within a can and an electrode terminal electrically connected to the electrode assembly, the can having an opening sealed by a cap plate, a top case attached to the battery cell at a top portion of the battery cell, the top case having an inner space and a protective circuit module including a protection circuit board arranged within said inner space of said top case and electrically connected to the electrode assembly, wherein the top case includes a top portion opposite from the electrode assembly and first and second pairs of opposed sides, the first pair of opposed sides having an edge, a portion of the edge has a recessed interference preventing portion, the recessed interference preventing portion corresponds to a location of a weld connecting an electrode tap to the electrode terminal.

4 Claims, 6 Drawing Sheets

(56) References Cited

U.S. PATENT DOCUMENTS

| | | |
|---|---|---|
| 2008/0176131 A1 | 7/2008 | Byun et al. |
| 2009/0130494 A1* | 5/2009 | Jang .................................. 429/7 |
| 2009/0155631 A1 | 6/2009 | Baek et al. |
| 2009/0258285 A1* | 10/2009 | Kim ................................ 429/97 |
| 2010/0055560 A1 | 3/2010 | Jang et al. |
| 2010/0086845 A1 | 4/2010 | Jung et al. |
| 2010/0098973 A1 | 4/2010 | Lee et al. |
| 2010/0136423 A1 | 6/2010 | Seo et al. |
| 2010/0159313 A1 | 6/2010 | Byun et al. |

FOREIGN PATENT DOCUMENTS

| | | |
|---|---|---|
| KR | 10-0821857 B1 | 4/2008 |
| KR | 20080047982 | 5/2008 |
| KR | 20080068266 | 7/2008 |
| KR | 20090063846 | 6/2009 |
| KR | 1020090108417 | 10/2009 |
| KR | 100943579 B1 | 2/2010 |

OTHER PUBLICATIONS

Korean Office Action issued by the KIPO on Sep. 27, 2011 in the corresponding Korean Patent Application No. 10-2011-0043069.
Korean Office Action issued by the KIPO on Sep. 27, 2012 in the corresponding Korean Patent Application No. 10-2011-0043069.

* cited by examiner

BATTERY PACK

CLAIM OF PRIORITY

This application makes reference to, incorporates the same herein, and claims all benefits accruing under 35 U.S.C. §119 from an application for BATTERY PACK earlier filed in the United States Patent & Trademark Office on Nov. 16, 2010 and there duly assigned Ser. No. 61/414,079.

BACKGROUND OF THE INVENTION

Field of the Invention

One or more embodiments of the present invention relates to a battery pack in which a top case including a protection circuit module (PCM) is coupled to a battery cell.

Description of Related Art

Unlike primary batteries, secondary batteries are chargeable and dischargeable. Secondary batteries are used as energy sources for small-sized devices, such as cellular phones, laptop computers, and camcorders, and medium-large sized devices such as electric cars, hybrid electric cars, electric bicycles, and uninterruptible power supplies (UPS).

A lithium secondary battery is an example of the secondary battery. The lithium secondary battery may be classified into a can-type secondary battery, which has a cylindrical and square pillar shape, and a pouch-type secondary battery having flexibility according to the shape of a case accommodating an electrode assembly.

Conventionally, a battery cell accommodating an electrode assembly is electrically connected to a protection circuit module (PCM). The PCM includes a plurality of electrode taps. In a secondary battery having a square pillar shape, a positive electrode tap is electrically connected to a can or cap plate of a battery cell, and a negative electrode tap is electrically connected to an electrode terminal of the battery cell. The PCM is installed in a top case, and the top case is coupled to the battery cell.

In a battery pack having a structure as described above, there is a need to reduce assembly errors, such as defects in welding, which may be caused during a process of assembling components when a top case is coupled to a battery cell.

SUMMARY OF THE INVENTION

One or more embodiments of the present invention include a battery pack in which a top case including a protection circuit module (PCM) is coupled to a battery cell.

According to one or more embodiments of the present invention, there is provided a battery pack that includes a battery cell including an electrode assembly arranged within a can and an electrode terminal electrically connected to the electrode assembly, the can having an opening sealed by a cap plate, a top case attached to the battery cell at a top portion of the battery cell, the top case having an inner space and a protective circuit module including a protection circuit board arranged within said inner space of said top case and electrically connected to the electrode assembly, wherein the top case may include a top portion opposite from the electrode assembly and first and second pairs of opposed sides, the first pair of opposed sides having an edge, wherein a portion of the edge may have a recessed interference preventing portion, wherein the recessed interference preventing portion corresponds to a location of a weld connecting an electrode tap to the electrode terminal.

The first pair of opposed sides of the top case may be longer than the second pair of opposed sides. Each of the sides of the first pair of opposed sides may include an edge having a recessed interference preventing portion. The electrode tap may electrically connect the electrode terminal to the protection circuit board of the protective circuit module. The electrode assembly may include a negative electrode plate and a positive electrode plate separated by a separator and rolled into a jellyroll configuration, the electrode terminal being connected to the negative electrode plate. The battery pack may also include an electrical insulator arranged on the cap plate in a vicinity of the electrode terminal, the electrical insulator to insulate the electrode terminal from the cap plate. One of the first pair of sides of the top case may include a recessed interference preventing portion at a location that corresponds to the electrical insulator.

The recessed interference preventing portions of each side of the first pair of sides of the top case may include a first portion, a second portion and a third portion, the third portion may be further recessed along the edges of each of the first pair of sides than the second portion and the second portion may be further recessed along the edges of each of the first pair of sides than the first portion by having the third portion being nested within the second portion and the second portion being nested within the first portion. The third portion of the recessed interference preventing portion on one of the first pair of sides of the top case may correspond to a location of the electrode terminal. The third portion of the recessed interference preventing portion of one of the first pair of sides of the top case may correspond to the location of the weld. The second portion of the recessed interference preventing portion of one of the sides of the first pair of sides of the top case may correspond to a location of an electrical insulator on the top case that electrically insulates the electrode terminal from the cap plate.

The top case may also include a position determination portion comprising a hook protruding from an inner wall of each of the first pair of sides. The protection circuit board may be arranged on an upper portion of the position determination portions. A location of the position determination portion on the inner wall of one of the first pair of sides may correspond to a location of the position determination portion on the inner wall of an other of the first pair of sides. Each inner wall of the first pair of sides of the top case may include a plurality of position determination portions.

According to another aspect of the present invention, there is provided a battery pack that includes a battery cell including an electrode assembly arranged within a can and a cap plate sealing an opening of the can, the battery cell further including an electrode terminal arranged on the cap plate and electrically connected to the electrode assembly, a top case attached to the battery cell at a top portion of the battery cell, the top case having an inner space, the top case includes a top portion opposite from the electrode assembly and first and second pairs of opposed sides, the first pair of opposed sides having an edge, wherein a portion of the edge has a recessed interference preventing portion, a protective circuit module including a protection circuit board arranged within said inner space of said top case and electrically connected to the electrode assembly and an electrode tap electrically connecting the electrode terminal to the protection circuit board, the electrode tap having a first end, a second end opposite the first end and a bend portion arranged between the first end and the second end, the recessed interference preventing portion of the top case being arranged at a location that corresponds to the second end of the electrode tap.

The bend portion may include a notch to facilitate bending of the bend portion. The first end of the electrode tap may be attached to the protection circuit board and the second end being attached to the electrode terminal. The electrode tap may be arranged between the cap plate and the protection circuit board arranged within the top case. The electrode tap may allow the top case to rotate open and closed with respect to the cap plate of the battery cell while electrically connecting the electrode assembly to the protection circuit board arranged within the top case

BRIEF DESCRIPTION OF THE DRAWINGS

A more complete appreciation of then invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention will be described in detail with reference to the accompanying drawing.

Figure 1:
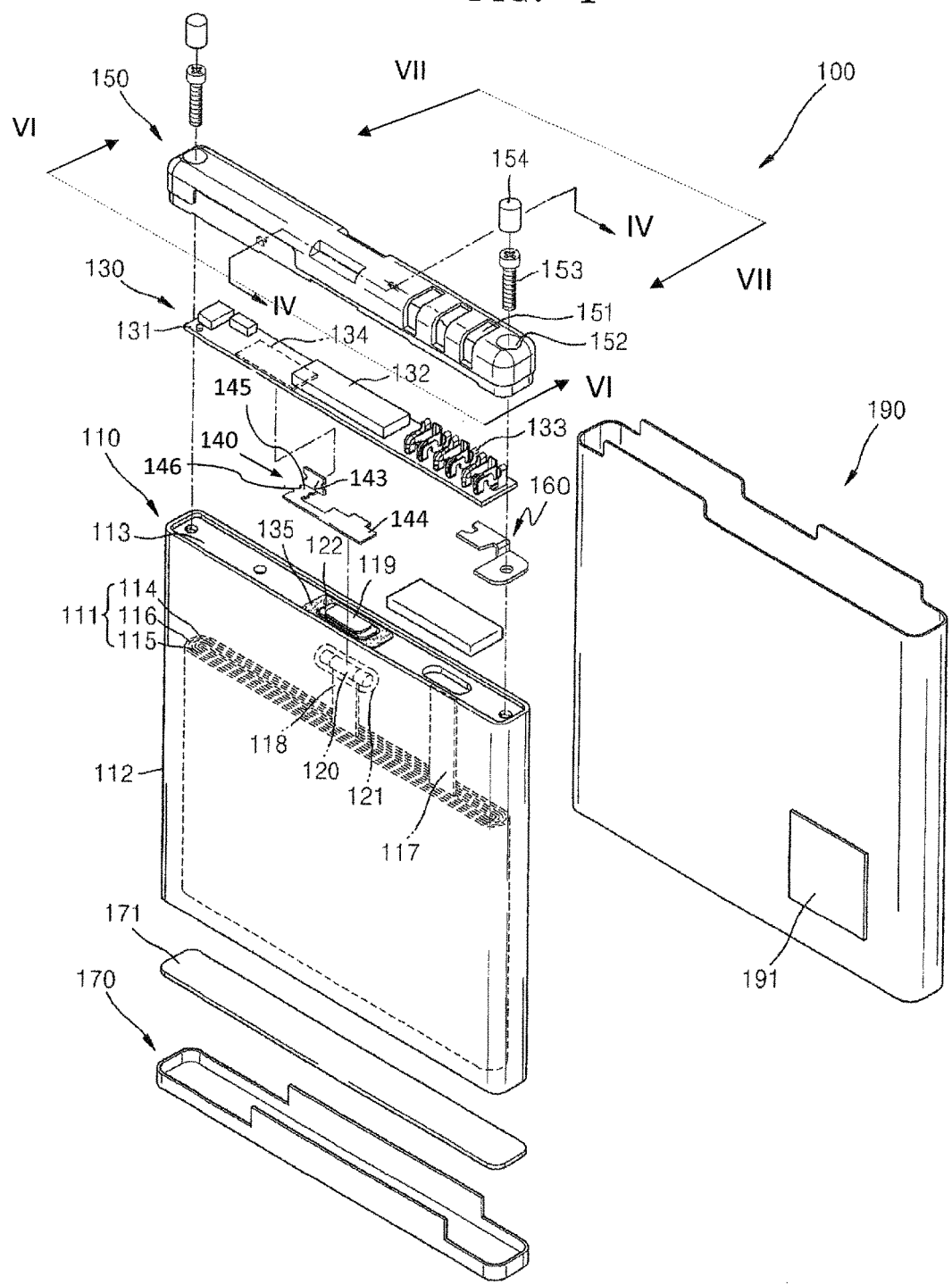
FIG. 1 is an exploded perspective view illustrating a battery pack according to an embodiment of the present invention.

Turning now to FIG. 1, FIG. 1 is an exploded perspective view illustrating a battery pack 100 according to an embodiment of the present invention. Referring to FIG. 1, the battery pack 100 includes a battery cell 110, a protection circuit module (PCM) 130, a top case 150, a bottom case 170, and an outer case 190. The battery cell 110 includes an electrode assembly 111, a can 112 for accommodating the electrode assembly 111, and a cap plate 113 sealing an opening of the can 112. The electrode assembly 111 includes a positive electrode plate 114, a negative electrode plate 115, and a separator 116 interposed between the positive electrode plate 114 and the negative electrode plate 115.

The positive electrode plate 114 includes a positive electrode current collector made out of a metal foil and a positive electrode active material layer coated on at least one surface of the positive electrode current collector. A positive electrode lead 117 is electrically connected to the positive electrode current collector of the positive electrode plate 114. The positive electrode lead 117 extends toward the top of the can 112 and is electrically connected to the cap plate 113. The positive electrode lead 117 may instead be directly connected to the can 112.

The negative electrode plate 115 includes a negative electrode current collector made out of metal foil and a negative electrode active material layer coated on at least one surface of the negative electrode current collector. A negative electrode lead 118 is electrically connected to the negative electrode current collector of the negative electrode plate 115. The negative electrode lead 118 extends toward the top of the can 112. The negative electrode lead 118 is electrically connected to a protection device such as a thermal fuse 120. The thermal fuse 120 is electrically connected to a negative electrode terminal 119. The thermal fuse 120 is surrounded by a polymer layer 121 to block a reaction with an electrolyte. A gasket 122 is disposed around the negative electrode terminal 119. The negative electrode terminal 119 is insulated from the cap plate 113 by the gasket 122. If there is no thermal fuse 120, the negative electrode lead 118 may be directly connected to the negative electrode terminal 119.

The separator 116 may be a film made out of a porous insulating material, such as polyethylene, polypropylene, or any combination thereof.

The electrode assembly 111 is formed by winding the positive electrode plate 114, the negative electrode plate 115, and the separator 116 interposed between the positive electrode plate 114 and the negative electrode plate 115 into a jelly-roll type configuration. The wound electrode assembly 111 is inserted into the can 112. The can 112 is a square pillar having space for accommodating the electrode assembly 111. The can 112 is made out of a conductive metal, such as aluminum (Al), iron (Fe), and an alloy of Al or Fe, and is fabricated by press molding, for example, by deep drawing.

The opening of the can 112 is sealed by the cap plate 113. The can 112 itself serves as a positive electrode terminal by being electrically connected to the positive electrode plate 114, the positive electrode lead 117, and the cap plate 113.

A PCM 130 is disposed between the battery cell 110 and the top case 150. The PCM 130 includes a protection circuit board 131. The protection circuit board 131 includes a printed circuit substrate on which at least one circuit pattern layer is stacked.

A plurality of electric devices 132 and a plurality of electrode output terminals 133 are mounted on the protection circuit board 131. The electric devices 132 include an integrated circuit (IC) chip, a field effect transistor (FET), a resistor, a capacitor, a positive temperature coefficient (PTC) element 134, etc. The electrode output terminal 133 includes a positive output terminal P+, a negative output terminal P−, and a resistance output terminal CF.

A positive electrode tap 160 that is electrically connected to the cap plate 113 of the battery cell 110 is electrically connected to a trace for the positive electrode on the protection circuit board 131. A trace is a conductive pathway arranged on the protection circuit board 131, and a trace of the positive electrode is a trace on the protection circuit board 131 that is connected to the positive electrode plate 114 of the electrode assembly 111. Likewise, a negative electrode tap 140 that is electrically connected to the negative electrode terminal 119 of the battery cell 110 is electrically connected to a trace for the negative electrode on the protection circuit board 131. Accordingly, the battery cell 110 is electrically connected to the PCM 130.

In this regard, the PTC element 134 is disposed on the trace of the negative electrode of the protection circuit board 131. The PTC element 134 is a safety element including a polymer and conductive particles. The PTC element 134 forcibly blocks a conductive pathway of the negative electrode between the protection circuit board 131 and the negative electrode terminal 119 when the temperature thereof or the current flowing therein exceeds a certain level. One end (or first metal thin plate) 143 of the negative electrode tap 140 is connected to the PTC element 134, and the other end (or second metal thin plate) 144 of the negative electrode tap 140 is connected to the negative electrode terminal 119.

Meanwhile, an insulating tape 135 may be attached to a portion of the cap plate 113 corresponding to the PTC element 134. Since cap plate 113 is positively charged, insulating tape serves to electrically insulate negative electrode terminal 119 from cap plate 113.

The PCM 130 is accommodated within the top case 150. The top case 150 including the PCM 130 is coupled to the upper end portion of the battery cell 110. The top case 150 protects the PCM 130 against external impact and prevents the protection circuit board 131 from being circuit-shorted. The top case 150 may be made out of a polymer resin such as polycarbonate. The top case 150 has a plurality of electrode output terminal holes 151 through which the electrode output terminal 133 is exposed outside of the top case 150.

The bottom case 170 covers the lower end portion of the battery cell 110.

The battery cell 110 is surrounded by the outer case 190. The outer case 190 may be a pouch to which an adhesive and a label 191 are adhered.

A method of fabricating the battery pack 100 will now be described. The electrode assembly 111 is fabricated by winding the positive electrode plate 114, the negative electrode plate 115, and the separator 116 interposed between the positive electrode plate 114 and the negative electrode plate 115 into a jelly-roll configuration. The wound electrode assembly 111 is inserted into the can 112. The opening of the can 112 is sealed by the cap plate 113 by welding portions of cap plate 113 to can 112.

In this regard, the positive electrode lead 117 extending from the positive electrode plate 114 is welded to the bottom surface of cap plate 113, and the negative electrode lead 118 extending from the negative electrode plate 115 is electrically connected to the thermal fuse 120 that is welded to the negative electrode terminal 119.

Separately, the PCM 130 is inserted into the top case 150 to prepare a sub-assembly. Then, the top case 150 is positioned at an upper portion of the battery cell 110, and the negative electrode tap 140 is welded to the negative electrode terminal 119. After the welding is completed, the top case 150 is coupled to the battery cell 110.

Then, the positive electrode tap 160 is electrically connected to the cap plate 113 by using a screw 153 via a screw hole 152 arranged in the top case 150. The screw hole 152 is filled with an adhesive 154.

Figure 5:
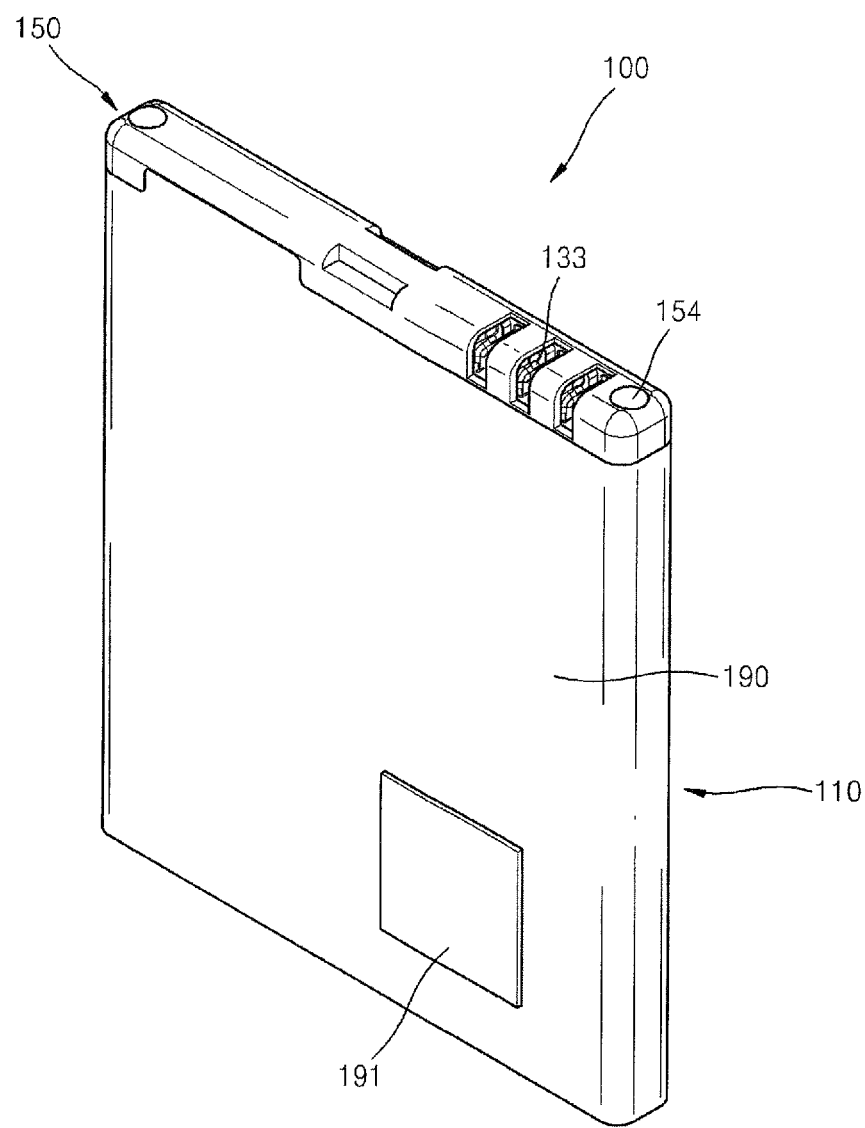
FIG. 5 is a perspective view of the battery pack of FIG. 1.

The bottom case 170 is coupled to the lower end portion of the battery cell 110 by an adhesive 171. The outer surface of the battery cell 110 is surrounded by the outer case 190. A label 191 for allowing identification of information about the battery pack 100 is attached onto the outer surface of the outer case 190. According to the assembly process, the battery pack 100 shown in FIG. 5 is fabricated.

In the present invention, the top case 150 has an interference preventing portion to avoid interference by a welding device when the negative electrode tap 140 is welded to the negative electrode terminal 119. This will now be described in more detail below.

Figure 2:
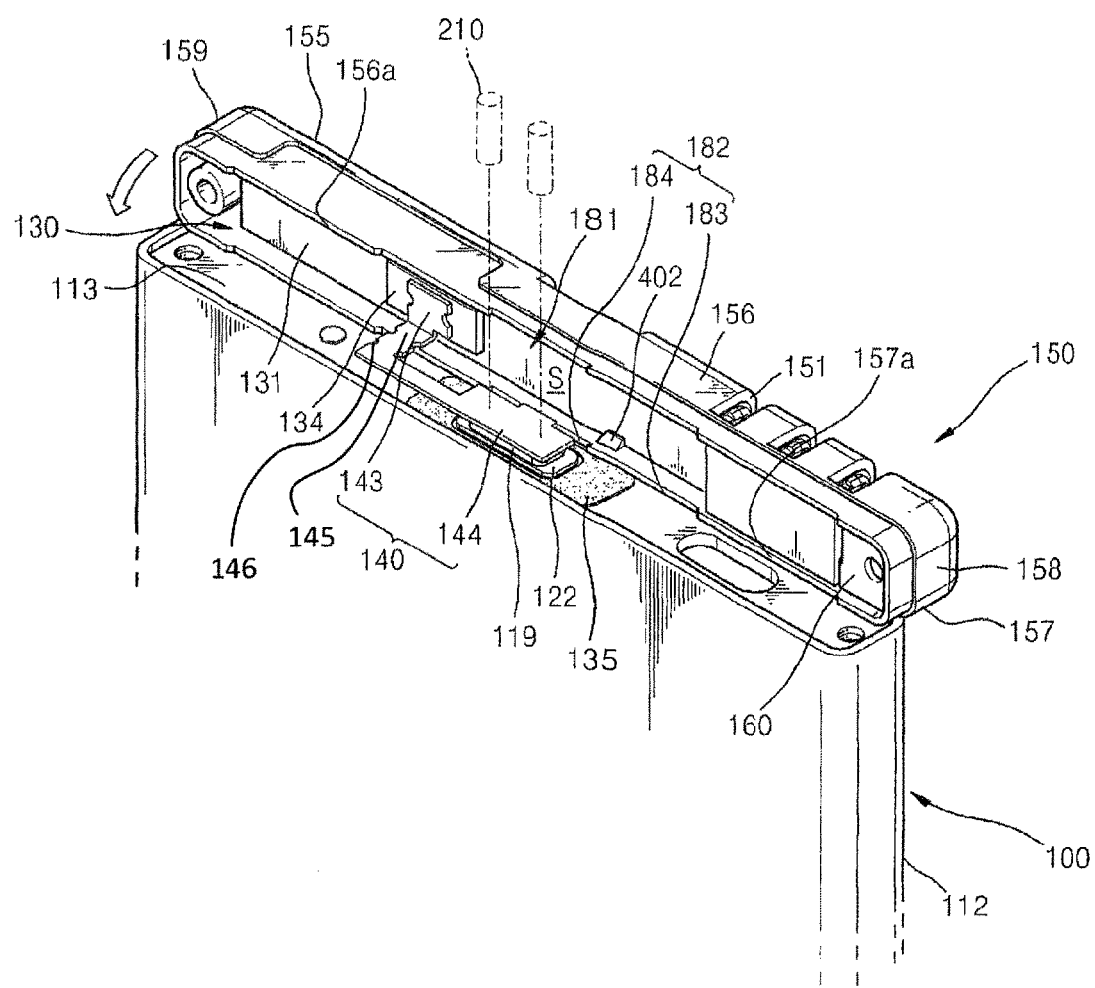
FIG. 2 is a perspective view of a battery cell and a top case accommodating a protection circuit module (PCM) of FIG. 1.
Figure 3:
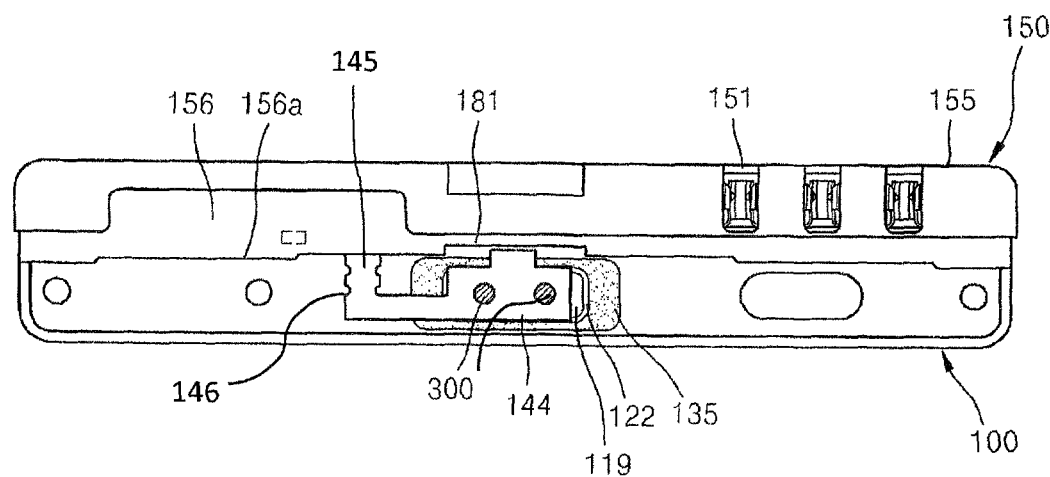
FIG. 3 is a plan view of FIG. 2.

Turning now to FIGS. 2 and 3, FIG. 2 is a perspective view of the battery cell 110 and the top case 150 accommodating the PCM 130 of FIG. 1 and FIG. 3 is a plan view of FIG. 2. Referring to FIGS. 2 and 3, the top case 150 includes a flat top portion 155, a first long side 156 and a second long side 157 which extend downward from both long side edges of the top portion 155 and facing each other, and a first short side 158 and a second short side 159 which extend downward from both short side edges of the top portion 155 and facing each other. The top case 150 has space S for accommodating the PCM 130.

The PCM 130 includes the protection circuit board 131. The negative electrode tap 140 and the positive electrode tap 160 are disposed on one surface of the protection circuit board 131 facing the battery cell 110.

The negative electrode tap 140 includes a first metal thin plate 143 and a second metal thin plate 144 that is bent with respect to the first metal thin plate 143. The second metal thin plate 144 extends from and is integrally formed with the first metal thin plate 143.

The negative electrode tap 140 may have any shape provided the first metal thin plate 143 is electrically connected to the protection circuit board 131, and the second metal thin plate 144 is electrically connected to the negative electrode terminal 119. In addition, the first metal thin plate 143 and the second metal thin plate 144 may be integrally formed with each other or separately formed and then coupled to each other.

In an assembly process of the PCM 130, the first metal thin plate 143 is electrically connected to an element on the trace of the negative electrode of the protection circuit board 131, such as the PTC element 134. To achieve this, the first metal thin plate 143 may be soldered to PTC element 134. This soldering process can occur when protection circuit module 130 is assembled to top case 150. Meanwhile, the positive electrode tap 160 is electrically connected to an element on the trace of the positive electrode of the protection circuit board 131.

The top case 150 is positioned at an upper portion of the battery cell 110 when the negative electrode tap 140 is welded to the negative electrode terminal 119. During this welding process, the top case 150 is positioned to expose a portion of the second metal thin plate 144 that is to be welded to the negative electrode terminal 119 in order to facilitate the welding. That is, the second long side 157 of the top case 150 is disposed close to one edge of the upper end portion of the battery cell 110, and the first long side 156 facing the second long side 157 is disposed in a path of a welding rod 210 of the welding device that is applied in a direction perpendicular to the welding portion. Accordingly, the portion of the negative electrode terminal 119 that is to be welded to second metal thin plate 144 is exposed to the outside.

The second metal thin plate 144 is in surface contact with the negative electrode terminal 119 and is welded to the negative electrode terminal 119 by the welding rod 210 of the welding device. The welding rod 210 passes the first long side 156 of top case 150 from an upper portion of the first long side 156 in a direction perpendicular to the portion of second metal thin plate 144 that is to be welded.

In this regard, the top case 150 has a size suitable for being inserted onto the battery cell 110, and thus the first long side 156 and the second long side 157 occupy more than a half of the upper portion of the top case 150. Accordingly, when the welding rod 210 passes the first long side 156 to be positioned above the second metal thin plate 144, the welding rod 210 may interfere with edge 156a of the first long side 156.

In order to prevent the interference, the first long side 156 has a first interference preventing portion 181. The first interference preventing portion 181 is formed by partially cutting the first long side 156 along an edge 156a of the first long side 156 so that the first long side 156 becomes recessed in the vicinity of where the welding rod 210 passes.

The size of the first interference preventing portion 181 cut from the first long side 156 is determined such that interference is not caused between the welding rod 210 and the first long side 156 when the welding rod 210 passes the first long side 156. Furthermore, the first interference preventing portion 181 preferably has a size suitable to completely expose the portion of the second thin metal plate 144 that is to be welded to the negative electrode terminal 119 in a direction perpendicular to the welding portion.

In addition, the second long side 157 has a second interference preventing portion 182. The second interference preventing portion 182 is formed by partially cutting the second long side 157 to prevent interference between the second long side 157 and the negative electrode terminal 119 or the gasket 122 when the top case 150 is positioned at an upper portion of the battery cell 110.

The second interference preventing portion 182 includes a first portion 183 that is cut from one edge 157a of the second long side 157 and a second portion 184 that extends from the first portion 183 and is cut. The first portion 183 is cut to avoid interference with the insulating tape 135, and the second portion 184 is cut to avoid interference with the negative electrode terminal 119 or the gasket 122. The shape of the second interference preventing portion 182 is substantially identical to that of the first interference preventing portion 181.

In an alternate variation to this embodiment, the edge of the insulating tape 135 may instead be cut to prevent interference with the second long side 157 without forming the first portion 183.

In the top case 150 having the structure described above, the second metal thin plate 144 contacts the negative electrode terminal 119, and the second long side 157 is positioned along one edge of the upper end portion of the battery cell 110. In this arrangement, since the second long side 157 has the second interference preventing portion 182, the second long side 157 may be positioned without interfering with the negative electrode terminal 119, the gasket 122, and the insulating tape 135 disposed on the cap plate 113.

Then, the welding rod 210 passes the first long side 156 from an upper portion of the first long side 156 in a direction perpendicular to the cap plate 113 so that the welding rod is positioned above the second metal thin plate 144, and the welding process is performed. In this regard, since the first long side 156 of top case 150 has the first interference preventing portion 181, the welding rod 210 may perform the welding without interfering with the first long side 156. Thus, a welding points 300 are formed at a desired location on the second metal thin plate 144.

According to the process described above, the negative electrode tap 140 is welded to the negative electrode terminal 119. After the welding is completed, the position of the top case 150 is changed according to the arrow in FIG. 2 to assemble the top case 150 to the battery cell 110.

Meanwhile, the position of the PCM 130 to which the negative electrode tap 140 is electrically connected may be determined by a position determination portion when the PCM 130 is inserted into an inner space S of the top case 150.

Figure 6:
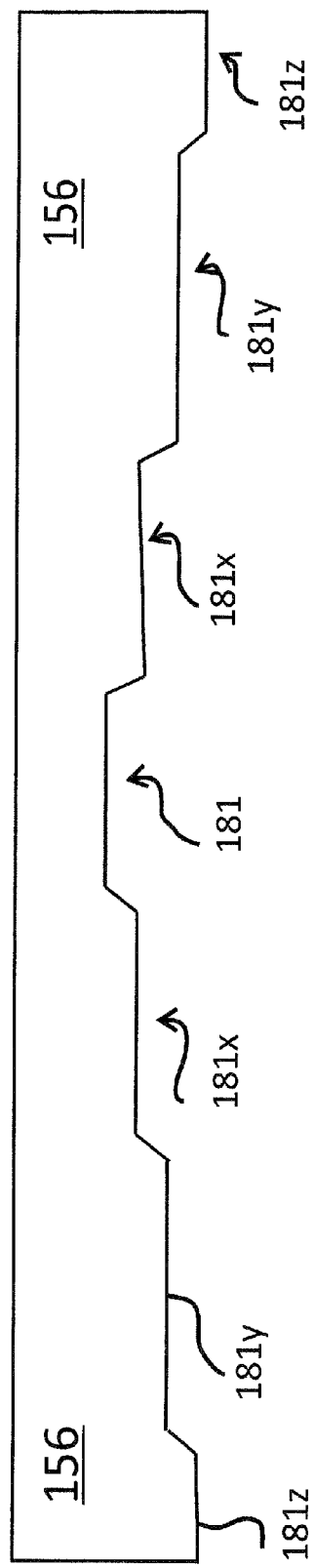
FIG. 6 is a close-up side view of top case taken along VI-VI of FIG. 1.
Figure 7:
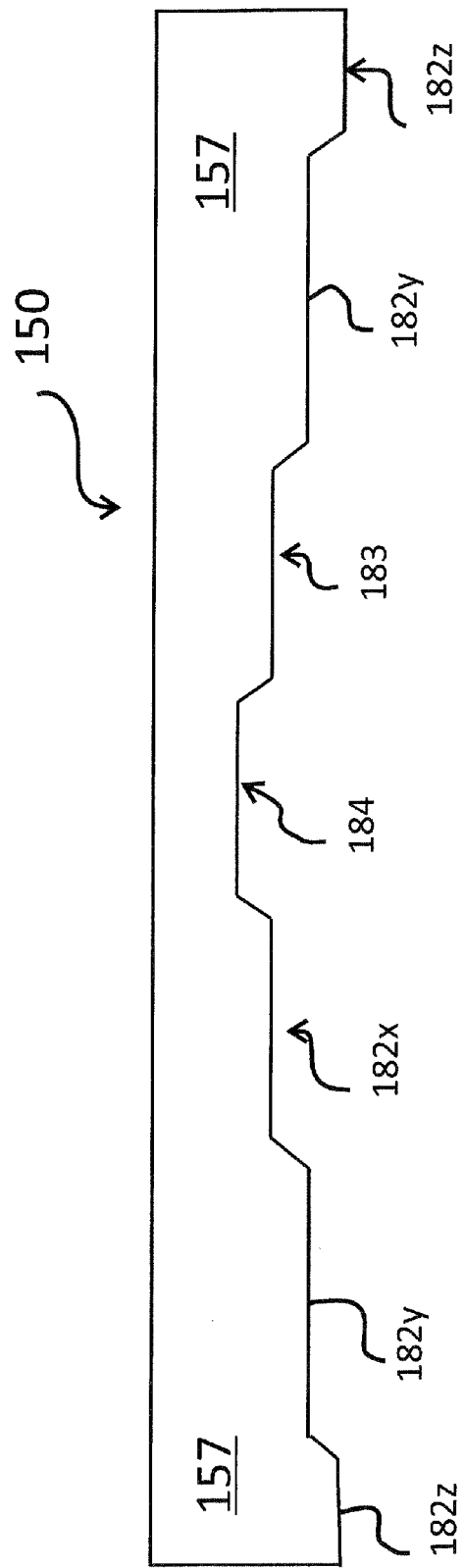
FIG. 7 is a close-up side view of top case taken along VII-VII of FIG. 1.

Turning now to FIGS. 6 and 7, FIG. 6 is a close-up view of first long side 156 of top case 150 taken along line VI-VI of FIG. 1 and FIG. 7 is a close-up view of second long side 157 of top case 150 taken along line VII-VII of FIG. 1. Referring now to FIG. 6, edge 156a of first long side 156 is actually recessed in three nested steps. Portions 181z at either end of edge 156a are unrecessed, and first interference preventing portion 181 at a center of edge 156a is nested within recessed portions 181x, which are nested within recessed portions 181y, which are recessed with respect to unrecessed portions 181z. Referring now to FIG. 7, edge 157a of second long side 157 has a profile similar to that of edge 156a of FIG. 6, where portion 184 is recessed from portions 183 and 182x, which are recessed from portions 182y which are recessed from unrecessed portions 182z at the left and right sides of edge 157a.

Figure 8:
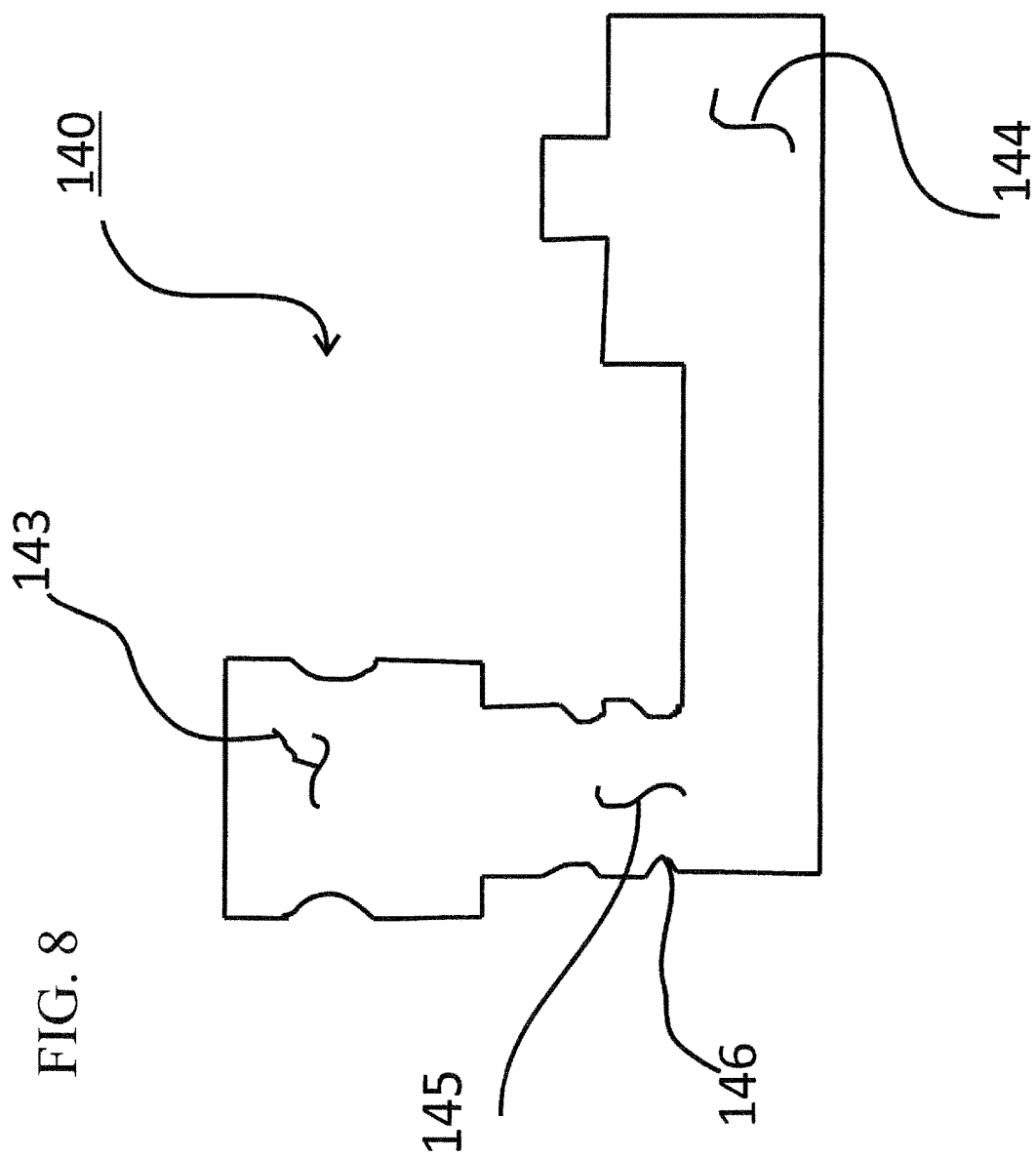
FIG. 8 is a close-up view of an electrode tap of the battery pack of FIG. 1.

Referring now to FIG. 8, FIG. 8 is a close-up view of the negative electrode tap 140 illustrated in FIGS. 1 through 3. As can be seen in FIG. 8, negative electrode tap 140 has a first end or first metal thin plate 143 connected to second end or second metal thin plate 144 by a bend portion 145. The bend portion 145 is capable of being bent, and may include one or more notches 146 to facilitate in the bending process.

In the present invention, the second end 144 of negative electrode tap is welded to negative electrode terminal 119, and the first end 143 is attached to protective circuit board 131 which is fixed within inner space S of top case 150. More specifically, the first end 143 may be connected to PTC element 134 arranged on a bottom side of protective circuit board 131.

Bend portion 145 having notches 146 is of significance during assembly as after both first and second ends 143 and 144 are fixed to the protective circuit board 131 and negative electrode terminal 119 respectively, top case 150 containing the protective circuit board 131 within is moved with respect to the battery cell 110 and the bend portion 145 with notches 146 allows the top case 150 to move without breaking negative electrode tap 140 even though the first end 143 of negative electrode tap 140 is attached to the protective circuit board 131 arranged within top case 150.

Figure 4:
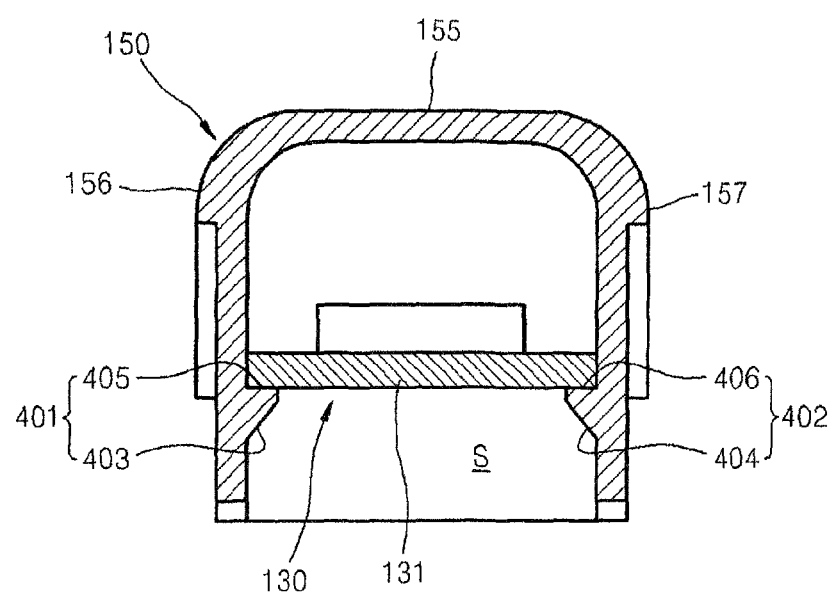
FIG. 4 is a cross-sectional view of the top case taken along line IV-IV of FIG. 1.

Turning now to FIG. 4, FIG. 4 is a cross-sectional view taken along line IV-IV of FIG. 1. Referring to FIG. 4, a first position determination portion 401 is disposed on an inner wall of the first long side 156. The first position determination portion 401 may be a hook protruding from the inner wall of the first long side 156 to the inner space S of the top case 150. A second position determination portion 402 is formed on an inner wall of the second long side 157. The second position determination portion 402 may also be a hook protruding from the inner wall of the second long side 157 to the inner space S of the top case 150. The first position determination portion 401 and the second position determination portion 402 are formed at the same location along the inner walls of the top case 150. A plurality of the first position determination portions 401 and the second position determination portions 402 may be formed.

In an alternate variation to the embodiment, the first position determination portion 401 and the second position determination portion 402 may have a shape consecutively protruding along the circumference of the inner wall of the top case 150. In addition, the top case 150 may have a coupling groove and a projection at a location corresponding to the protection circuit board 131 which are coupled to each other. The position of the PCM 130 is not limited in the top case 150.

The protection circuit board 131 having the structure described above is inserted into the space S of the top case 150, and the edge of the protection circuit board 131 is guided from a lower portion 403 of the first position determination portion 401 and a lower portion 404 of the second position determination portion 402. The protection circuit board 131 that passes the lower portion 403 of the first position determination portion 401 and the lower portion 404 of the second position determination portion 402 is positioned at an upper portion 405 of the first position determination portion 401 and an upper portion 406 of the second position determination portion 402 which serve as a hook. Accordingly, the PCM 130 may be installed in the top case 150.

As described above, in the battery pack, interference preventing portions are formed in the top case, and thus interference does not occur when the electrode tap is welded to the electrode terminal. In addition, since the top case has the position determination portions, the electrode tap may be efficiently welded to the electrode terminal in the top case after the PCM has been assembled into the top case.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A battery pack, comprising:
a battery cell including an electrode assembly arranged within a can and an electrode terminal electrically connected to the electrode assembly, the can having an opening sealed by a cap plate;
a top case attached to the battery cell at a top portion of the battery cell, the top case having an inner space; and
a protective circuit module including a protection circuit board arranged within said inner space of said top case and electrically connected to the electrode assembly, wherein the top case includes a top portion opposite the electrode assembly and first and second pairs of opposed sides, the first pair of opposed sides having an edge, wherein each of the sides of the first pair of opposed sides includes an edge having a portion which has a recessed interference preventing portion, wherein the recessed interference preventing portion corresponds to a location of a weld connecting an electrode tap to the electrode terminal, and wherein shapes of the recessed interference preventing portions are substantially identical to each other;
wherein the recessed interference preventing portions of each side of the first pair of sides of the top case comprise a first portion, a second portion and a third portion, the third portion being further recessed along the edges of each of the first pair of sides than the second portion and the second portion being further recessed along the edges of each of the first pair of sides than the first portion by having the third portion nested within the second portion and the second portion nested within the first portion.

2. The battery pack of claim 1, wherein the third portion of the recessed interference preventing portion on one of the first pair of sides of the top case corresponds to a location of the electrode terminal.

3. The battery pack of claim 1, wherein the third portion of the recessed interference preventing portion of one of the first pair of sides of the top case corresponds to the location of the weld.

4. The battery pack of claim 1, wherein the second portion of the recessed interference preventing portion of one of the sides of the first pair of sides of the top case corresponds to a location of an electrical insulator on the top case that electrically insulates the electrode terminal from the cap plate.

* * * * *